(12) United States Patent
Lefevre et al.

(10) Patent No.: US 6,527,956 B1
(45) Date of Patent: Mar. 4, 2003

(54) METHOD FOR REGULATING AERATION DURING WASTE WATER BIOLOGICAL TREATMENT

(75) Inventors: Fanny Lefevre, Poissy (FR); Philippe Caulet, Bailly (FR); Bruno Bujon, Chatou (FR); Jean-Pierre Philippe, Herblay (FR)

(73) Assignee: Suez Lyonnaise des Eaux, Nanterre Cedex (FR)

( * ) Notice: Subject to any disclaimer, the term of this patent is extended or adjusted under 35 U.S.C. 154(b) by 0 days.

(21) Appl. No.: 09/674,998

(22) PCT Filed: May 31, 1999

(86) PCT No.: PCT/FR99/01273
§ 371 (c)(1),
(2), (4) Date: May 7, 2001

(87) PCT Pub. No.: WO99/62832
PCT Pub. Date: Dec. 9, 1999

(30) Foreign Application Priority Data

Jun. 2, 1998 (FR) .............................. 98 06918

(51) Int. Cl.[7] .............................................. B01D 12/00
(52) U.S. Cl. ........................ 210/614; 210/120; 210/903
(58) Field of Search ................................ 210/605, 614, 210/620, 630, 903

(56) References Cited

U.S. PATENT DOCUMENTS

| | | | |
|---|---|---|---|
| 5,288,406 A | * | 2/1994 | Stein .......................... 210/614 |
| 5,304,308 A | * | 4/1994 | Tsumura et al. ............ 210/614 |
| 5,582,734 A | * | 12/1996 | Coleman et al. ............ 210/903 |
| 5,624,565 A | * | 4/1997 | Lefevre et al. ............. 210/614 |
| 5,733,456 A | * | 3/1998 | Okey et al. .................. 210/605 |
| 6,093,322 A | * | 7/2000 | Bongards ..................... 210/614 |
| 6,254,778 B1 | * | 7/2001 | Chudoba et al. ............. 210/614 |
| 6,312,600 B1 | * | 11/2001 | Audic et al. ................. 210/614 |

FOREIGN PATENT DOCUMENTS

| | | | |
|---|---|---|---|
| FR | 2756273 | * | 5/1998 |
| JP | 4104896 | * | 4/1992 |
| JP | 5031488 | * | 2/1993 |
| JP | 9122681 | * | 5/1997 |

* cited by examiner

Primary Examiner—Christopher Upton
(74) Attorney, Agent, or Firm—Connolly Bove Lodge & Hutz LLP

(57) ABSTRACT

A process is disclosed for regulating the aeration in a biological wastewater treatment plant using a carbon removal stage, a nitrification stage and a denitrification stage. The process includes the step of continuously measuring the value of oxidation-reduction potential of the treated medium as well as measuring oxygen concentration of the treated medium during aeration phases. This permits maintaining aeration if the oxygen concentration falls within a preselected reference range. Alternately there is reduction of the aeration if the oxygen concentration is above the preselected reference range, or increasing the aeration if the oxygen concentration falls below the preselected reference range. The process requires comparing the oxygen concentration in the treated medium with the preselected reference range during a transition of the oxidation-reduction potential (partial nitrification/total nitrification); and adjusting the reference range of oxygen concentration to a new set of values to correct the oxygen concentration toward a preselected desired level.

5 Claims, 3 Drawing Sheets

METHOD FOR REGULATING AERATION DURING WASTE WATER BIOLOGICAL TREATMENT

FIELD OF THE INVENTION

The invention relates to a process for the regulation of the aeration of a biological wastewater treatment plant for the removal of carbon and nitrogen pollution.

BACKGROUND OF THE INVENTION

It is known that the purification of wastewater constitutes a major problem. Accordingly, the European Union has been led to issue a directive (No. 91/271/ EEC) relating to the treatment of urban wastewater which determines the limits of discharges, into the natural environment, of untreated wastewater. Thus, each treatment unit is attributed a precise objective as regards the quality of the water treatment, it being possible for failure to achieve such an objective to give rise to penalties of a financial or even a penal nature.

The majority of urban wastewater treatment plants use the activated sludge process. An important phase of this process consists in the removal of the carbon and the nitrogen contained in the wastewater, by sequencing of the periods of aeration. It is indeed known that the main problem encountered in wastewater treatment plants is adapting the treatment to the variations in the rate of entry of the water to be purified and to its polluting load, so as to obtain a constant quality of purified water and the minimum regulatory quantity of polluting discharges into the natural environment. For this purpose, the removal of carbon and nitrogen requires a very strict and precise control of aeration given that this removal must correspond to two requirements. According to the first, a sufficient total duration of aeration should be provided per day in order to carry out the oxidation of the carbon components of the wastewater and the stabilization of the sludge; the second is linked more directly to the daily distribution of the aeration phases in order to successfully carry out the removal of the nitrogen. On the one hand, it is necessary to observe a sufficient period for maintaining under aerobic conditions for the sludge to perform the nitrification and, on the other hand, the denitrification requires an appropriate effluent residence time under anoxic conditions. For this purpose, in the small-load activated sludge processes used in a single aeration basin, the removal of nitrogen compounds results from a strict control of the alternation of the aerated and nonaerated sequences.

Any defect in the setting or the operation of the oxygen supply devices results in a malfunction of the wastewater purification stations, with repercussions on the quality of the effluent treated, the equilibrium of the purifying biomass and the characteristics of the sludge produced.

A lack of adaptation of the aeration sequences therefore has effects in the short term on the quality of the water obtained which may then contain nonoxidized nitrogen compounds if the periods of aeration are not sufficiently long, or nitrates if the periods of anoxia are too short. By contrast, when the periods of nonaeration are too long, the effluent to be treated encounters anaerobic conditions which must be absolutely avoided. Indeed, the phenomena of anaerobiosis in the treatment basin, linked to an underoxygenation of certain zones, cause in the long term the appearance of filamentous bacteria and these microorganisms induce a modification of the structure of the floc and a reduction in its sedimentation ability, which of course has an unfavourable repercussion on the quality and the cost of the treatment. Another consequence of an insufficient cumulative duration of aeration relates to the quality of the sludge and, in particular, determines its stability.

It can be understood why the regulation of aeration is one of the key points in such a water treatment process. Various methods of regulation have been used. Among these, the techniques below may be mentioned:

1) The most rustic technique in the field of the aeration of biological basins is the timer which, depending on a program defined by the user, makes it possible to deliver oxygen at defined times of the day, without any correlation with the real need of the plant, 2) a slightly improved technique is the decision for aeration based on a high threshold and a low threshold of the oxidation-reduction potential (Redox potential) measured on the plant: the decision is taken on information at the time T, information which can be refuted a few seconds later, 3) a more rigorous technique has been developed by the present holder (FR-A-2,724,646). This method takes into account various Redox potentials, the derivative of the variation of this Redox potential and the history of the purification station, thus approaching the notion of an expert system, 4) other regulation logics are based on the measurement of the concentration of oxygen in the water to be purified; given that this notion does not really make sense, during the phases for nonaeration of the basins, the measurement of the oxygen concentration is then replaced with a timer which will assign a nonaeration time (period of anoxia) for example from 40 to 60 minutes, followed by a period during which the regulation would be effectively performed on the reference value for oxygen, with for example gradual stopping of the aeration turbines, one by one, 5) some attempts at regulation were made with respect to the measurement of the concentration of the ammoniacal and nitro compounds in the aeration basin, by characterizing the nitrification and denitrification efficiency and, subsequently, the oxygen requirements of the purification station.

The use of the various prior art techniques mentioned above reveals numerous disadvantages which demonstrate their limitations. Among these disadvantages, the following may be mentioned in particular:

1) automatic control by a timer obviously takes no account of the variations in polluting load imposed on the station by the irregular nature of the supply of water to be treated.

2) the method of Redox thresholds does not take into account the history of the purification station, such as temporary overloads, temporary breakdown of equipment, and the like.

3) the process according to FR-A-2,724,464 makes it possible to provide efficient depollution, on the carbon pollution, at the nitrification level and at the denitrification level. However, the objective of this method is to provide sufficient aeration which in fact always results in an excess supply of oxygen. However, this excess can be a drawback from an economic point of view. Furthermore, from the point of view of the water treatment, the aeration phase is affected because it starts in the presence of a relatively high content of oxygen, from 7 to 8 mg/l, which has to be removed before starting to use the oxygen of the nitrates. For the same period of denitrification, the phase for stopping the aeration will be correspondingly longer, and the effective treatment time is reduced over a day.

4) the use of the technique based on a simple measurement of the concentration of oxygen in the water to be purified does not make it possible to control the state of progress of the denitrification reactions which occur in the activated sludge basins since there is a need for a zero oxygen concentration to accomplish this phase. Furthermore, the oxygen concentrations necessary to bring about the nitrification can change in a range going from 3 to 7 mg/l, depending in particular on the state of oxidation of the sludge present in the biological reactor.

5) the technique based on the measurement of the concentration of the ammoniacal and the nitro compounds in the aeration basin can only be envisaged in large stations, given the high cost of the equipment. Moreover, this technique takes no account of the oxidation state of the sludge whereas a measurement of the oxidation-reduction potential according to FR-A-2,724,646 makes it possible to evaluate the physiological state of the sludge.

The disadvantages of the abovementioned prior art solutions therefore lead to a search for means which make it possible to optimize the various reactions in the aeration basins of the purification station, while controlling more judiciously the supply of oxygen to the latter. This constitutes the problem solved by the present invention.

BRIEF DESCRIPTION OF THE INVENTION

The subject of the present invention is therefore a process for regulating the aeration in a biological wastewater treatment plant using a carbon removal stage, a nitrification stage and a denitrification stage, characterized in that it comprises the following stages:

1) continuously measuring the value of the oxidation-reduction potential of the treated medium, making it possible to activate or otherwise the aeration means;
2) during the aeration phases, measuring the oxygen concentration and exploiting its value, together with those of the oxidation-reduction potential in order to:
   maintain the aeration if the oxygen concentration corresponds to a reference range;
   reduce the aeration if the oxygen concentration is above the reference range, and
   increase the aeration if the oxygen concentration is below the reference range, and
3) carrying out a self-adjustment of the reference values for oxygen by comparing, during the transition of the oxidation-reduction potential "partial nitrification/total nitrification", the real oxygen concentration with the reference range for the system and adjusting the reference value according to the real oxygen need of said system.

According to the present invention, when the Redox transition "partial nitrification/total nitrification" exists in the lower region of the reference range for the oxygen concentration, the value of this reference is reduced.

According to the invention, when the value of the Redox transition "partial nitrification/total nitrification" is not reached for the reference value for the oxygen concentration, the latter is increased.

It is evident why the process which is the subject of the present invention constitutes a combination of a process as defined in FR-A-2,724,646, comprising a monitoring of the derivative of the variation of the oxidation-reduction potential, with a monitoring of the "oxygen concentration" signal solely during the aeration phase. Schematically, the analysis of the oxidation-reduction potential values makes it possible to define the duration of the start and stop sequences for the plant and the analysis of the oxygen concentration values makes it possible to control the power which has to be used during the aeration phases.

According to the invention, there is added to this combination measurement of the Redox potential+measurement of the oxidation concentration as absolute value $[O_2]$, the continuous comparison of said parameters which makes it possible to deduce and to confirm the coherence of the information gathered on the station. Thus, by virtue of the use of the process according to the invention, various information and possibilities for crucial interventions relating to the state of the station are accessible such as, in particular:

the control of the reliability of the sensors for the Redox potential and for the oxygen concentration;

the control of the reliability of the equipment or the identification of the pollution overloads;

the finer analysis of the biological state of the sludge, the possibility of readjusting the reference values for the oxygen concentration as a function of the performance of the sludge, and embarking on the denitrification phase with a relatively low content of residual oxygen and ensuring a rapid initiation of the denitrification phase.

Other characteristics and advantages of the invention will emerge from the description made below with reference to the accompanying drawings in which:

DETAILED DESCRIPTION OF THE INVENTION

Figure 1:
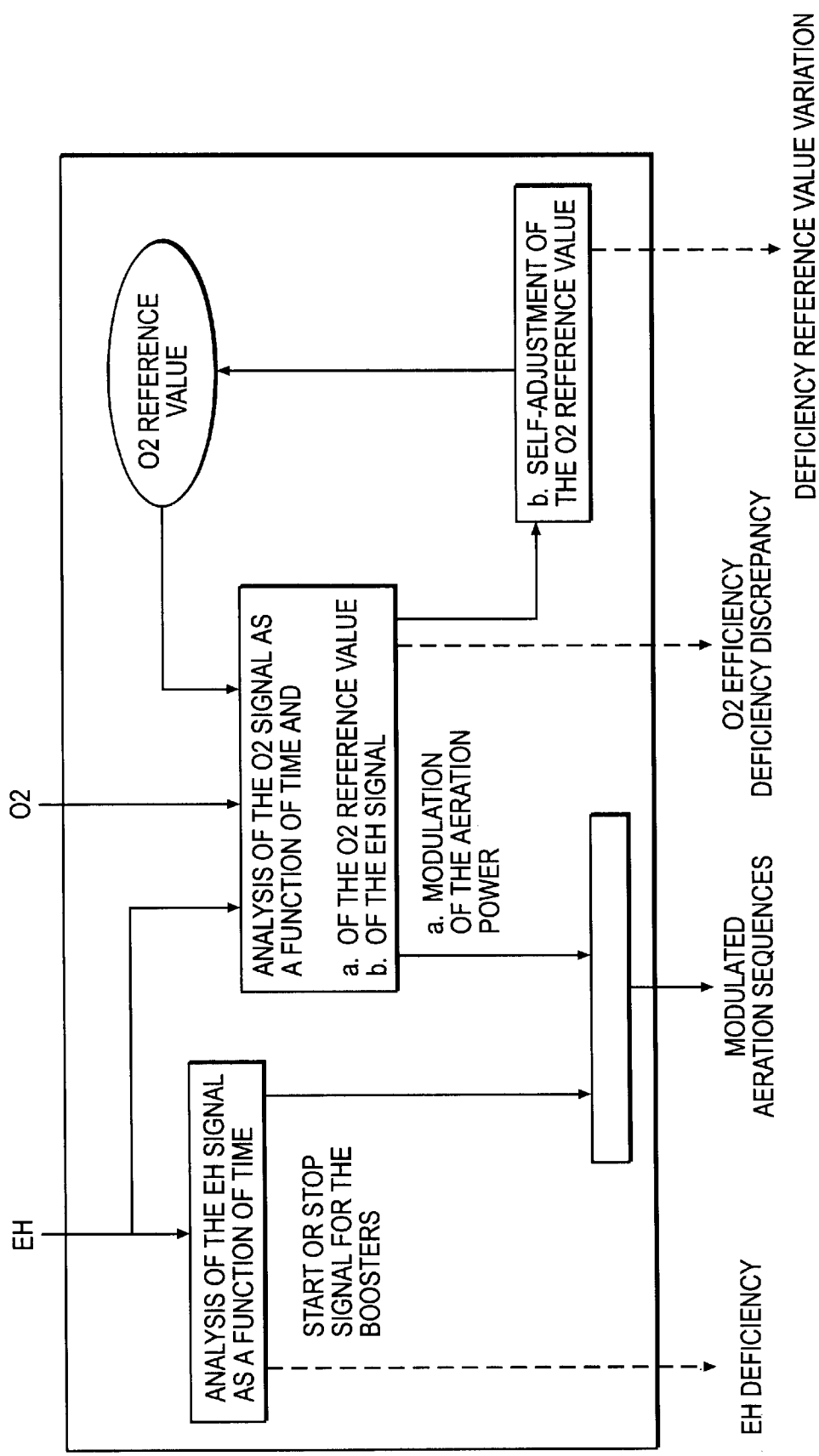
FIG. 1 is a diagram showing the various stages of the process of the invention as defined above.

Thus, as mentioned above, the various stages of the process of the invention, illustrated by the diagram in FIG. 1, can be summarized in the following manner:

First of all, during the starting phase, aeration is provided at the maximum capacity of the plant so as to provide a massive supply of oxygen: experience shows that this massive supply is useful for good implementation of the purification.

Stage 1:

Continuous measurement of the value of the Redox potential (EH) for the treated medium which makes it possible to activate or otherwise the aeration means (aeration booster).

Stage 2:

Examination of this Redox potential: if the value of this potential is high, the nitrification and the removal of the carbon occur well; if the value of the Redox potential is low, this is due to insufficient nitrification and removal of the carbon, which requires carrying out an examination of the oxygen component of the regulation.

Figure 2:
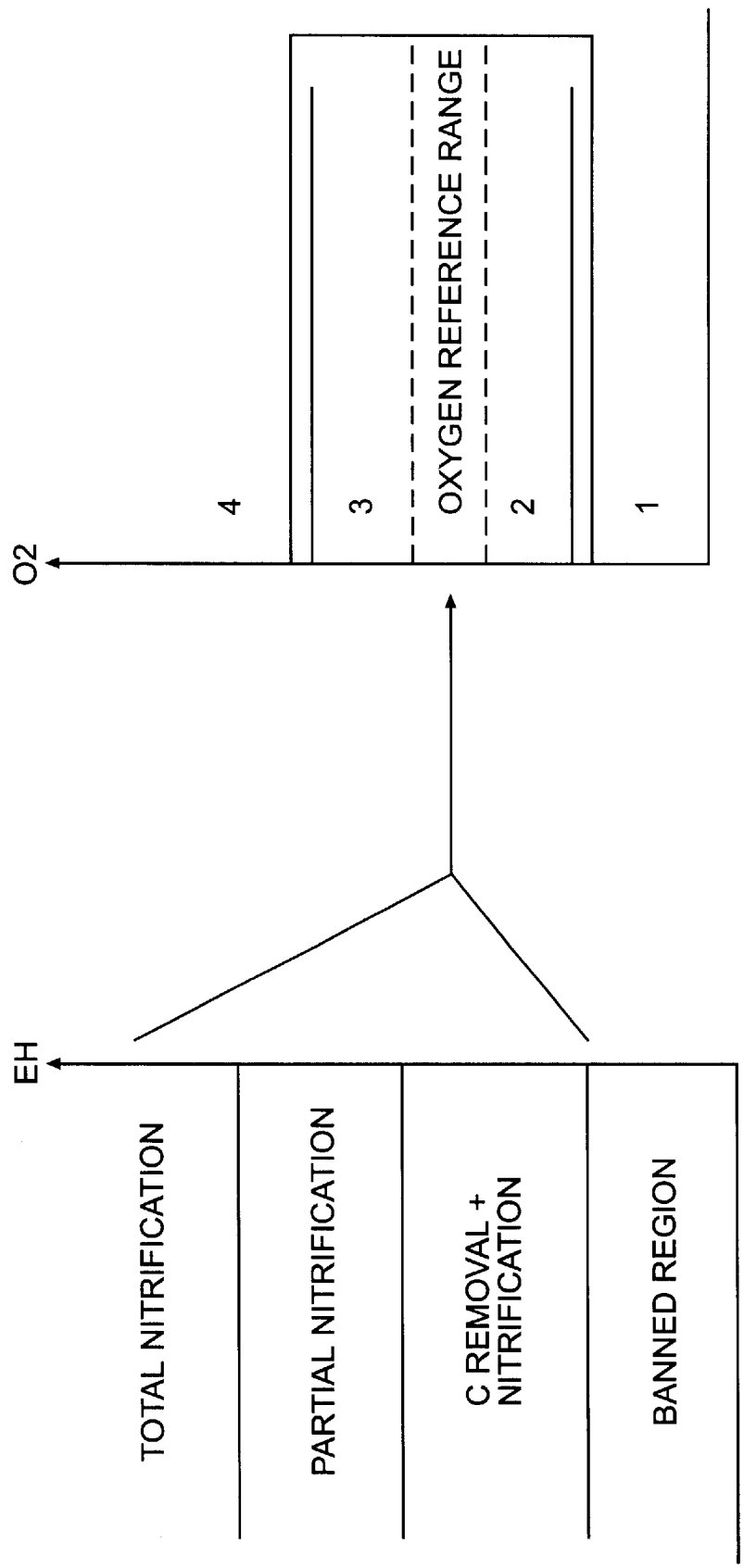
FIG. 2 is a diagram which makes it possible to understand the implementation of the process of the invention.

Stage 3:

Carrying out measurement of the oxygen concentration of the medium treated and examination of this concentration (see FIG. 2). The following cases may present themselves:

a) either the value of the oxygen concentration $[O_2]$ is situated in the region in FIG. 2 called "Oxygen Reference Range": the aeration power should be maintained, b) or the value of the oxygen concentration $[O_2]$ is situated in the region designated by the reference 2 in FIG. 2 (that is to say below the reference value for [$O_2$]: the oxygenation power should be increased or, failing this, the aeration boosters should be kept operating at their maximum in order to provide the necessary quantity of oxygen, c) or the [$O_2$] value is situated in the region designated by the reference 3 in FIG. 2 (that is to say above the reference range for [$O_2$]), the Redox potential may be insufficient but the reference value for oxygen is exceeded: the aeration is reduced, or failing that, the aeration boosters are kept operating at their minimum, d) or the [$O_2$] value is situated in the region designated by the reference 1 in FIG. 2 (Redox potential and oxygen concentration too low), this situation may correspond to an overloading of the station (high respiration of the sludge) or to a breakdown in the equipment or the sensors: in this case, the invention allows for an alarm to be triggered, and e) or the [$O_2$] value is situated in the region designated by the reference 4 in FIG. 2: the combination of a high content of oxygen with an average Redox potential may indicate a fault in the sensors or a poisoning of the biomass (low respiration of the sludge) : in this case, the invention also provides for an alarm to be triggered.

Last stage:

It was seen above that the invention allowed for an additional stage consisting in the self-adjustment of the reference values for the oxygen concentration.

During the transition of the oxidation-reduction potential from the "partial nitrification" region to the "total nitrification" region, the invention provides for a measurement of the oxygen concentration in the system to be carried out in order to modify the oxygen reference values, which makes it possible to reevaluate the real needs for oxygen which are necessary for the nitrification reactions to be carried out and for complete oxidation of the constituents of the sludge.

If this Redox transition occurs in the regions 1 or 2 (FIG. 2) of the oxygen concentration values, the need for oxygen required by the biomass is low and, according to the invention, the oxidation reference value is reduced, which makes it possible to promote energy savings in relation to the aeration.

Conversely, when the value of the Redox transition cannot be regularly reached under the proposed reference oxygen concentration conditions, there is a high need for oxygen and it is therefore necessary to increase the [$O_2$] reference value. This increase makes it possible to secure the process and to promote, in this case, reoxygenation of the sludge.

Figure 3:
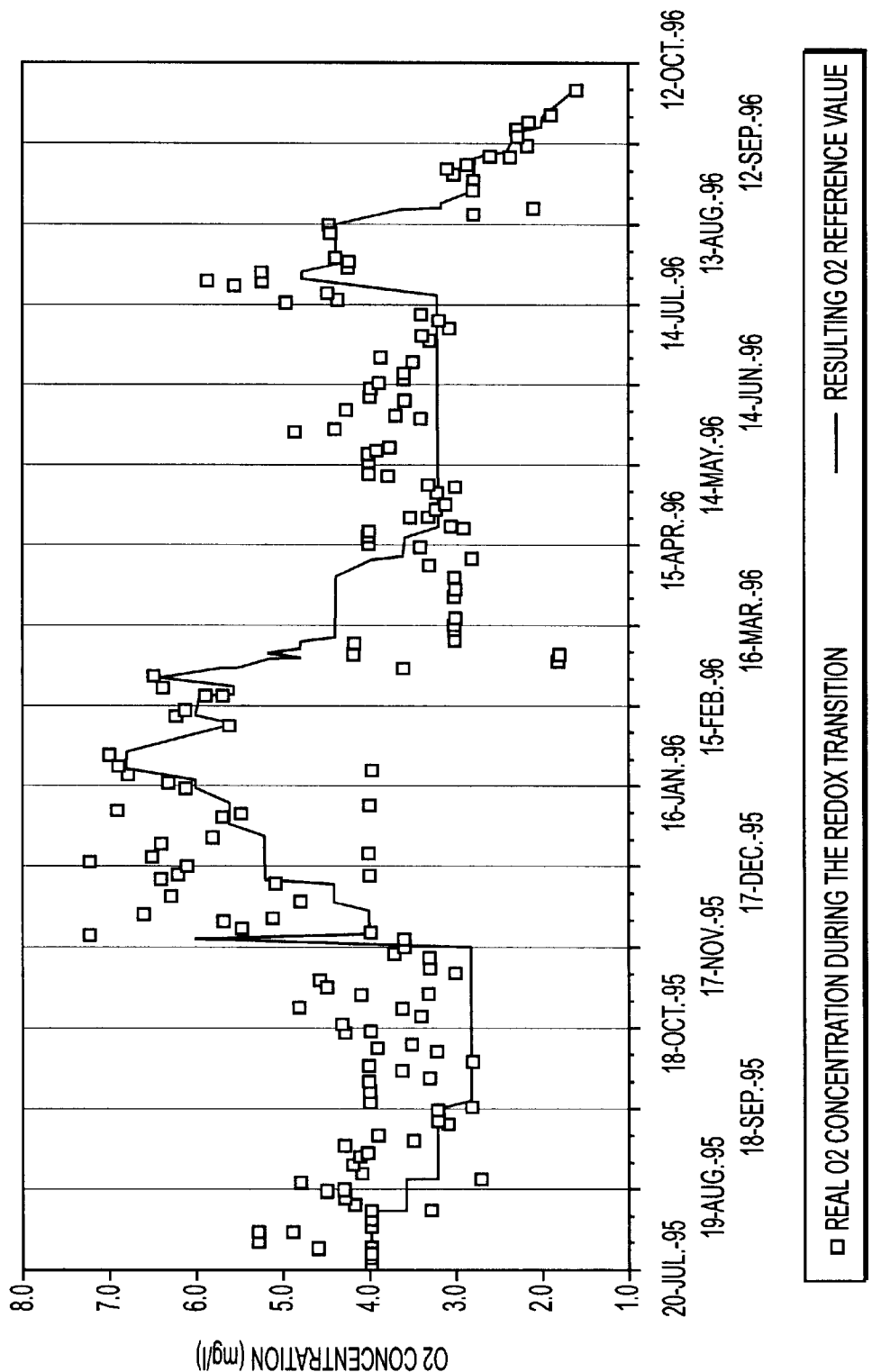
FIG. 3 is a curve illustrating the variations of the oxygen concentration threshold as a function of time, measured on an industrial plant.

In FIG. 3 of the accompanying drawings, the variation in the oxygen concentration threshold as a function of time has been represented, this figure making it possible to show how, by using the process of the invention, a self-adjustment of the [$O_2$] reference threshold values is obtained.

This FIG. 3 represents the variations in the oxygen thresholds over the duration of the study period (essentially 1 year) . The points ⑤ termed real value represent the dissolved oxygen concentrations reached when the Redox potential indicated a passage from "partial nitrification" to "complete nitrification" in "PHASE 3". The continuous and more stable line represents the oxygen reference value defined by the control logic, on the basis of the real values. The variations are dampened here so as to limit the modifications in reference values while making the process reliable.

It is important to note the range of variation of this [$O_2$] reference value which reflects the large variation in the real needs of the biomass (making the populations younger and the like). In fact the curve in FIG. 3 teaches that the biological system can function very well in total nitrification, with a dissolved oxygen content of the order of 2 to 3 mg/l (case of "old" sludge), whereas in some cases ("younger" sludge), a content of 5 to 6 mg/ml is found to be insufficient to ensure total nitrification. The invention makes it possible to overcome this difficulty and it leads to self-adjustment of the operating conditions.

In the table below, there have been indicated the comparative results obtained on three plants using respectively a process for biological wastewater treatment without automatic regulation (A), with automatic regulation of the Redox potential EH only (B) and with automatic regulation of the Redox potential EH and the oxygen concentration according to the invention (C). This table clearly shows the advantages, in particular the economic advantages, offered by the use of the process which is the subject of the present invention.

| | Plant 1 40,000 | | | Plant 2 12,000 | | Plant 3 100,000 |
|---|---|---|---|---|---|---|
| Nominal capacity (EH) | | | | | | |
| Process used | A | B | C | B | C | C |
| Satisfactory BOD assessments | 2/2 | 11/11 | 5/5 | 8/8 | 16/16 | 57/57 |
| Satisfactory Total Nitrogen assessments | 0/2 | 11/11 | 5/5 | 8/8 | 16/16 | 56/57 |
| BOD and Total Nitrogen compliance | no | yes | yes | yes | yes | yes |
| Reduction (BOD) % | 86 | 97 | 97 | 97 | 97 | 98 |
| Reduction (Total Nitrogen) % | 62 | 90 | 88 | 90 | 90 | 85 |
| Economic evaluation C/B | | | −20% | | −15% | |

Among the advantages provided by the process which is the subject of the invention, the following may be mentioned in particular:

modulation of the aeration power provided, which is necessary for carrying out the reactions for treating the carbon and nitrogen pollutants;

possibility of verifying the coherence of the information received and of detecting the limiting events, which occur in the purification station, and possibility, for example a finer expertise of the requirements of the sludge, of carrying out a self-adjustment of the actual reference values for regulating the system with a view to making it reliable.

It remains clearly understood that the invention is not limited to the exemplary embodiments described and/or mentioned above but that it encompasses all the variants which may fall within the scope of the accompanying claims.

What is claimed is:

1. A process for regulating the aeration in a biological wastewater treatment plant using a carbon removal stage, a nitrification stage and a denitrification stage, comprising the following steps:

continuously measuring the value of oxidation-reduction potential of the treated medium;

measuring oxygen concentration of the treated medium during aeration phases;

maintaining aeration if the oxygen concentration falls within a preselected reference range;

reducing the aeration if the oxygen concentration is above the preselected reference range;

increasing the aeration if the oxygen concentration falls below the preselected reference range; and comparing the oxygen concentration in the treated medium with the preselected reference range during a transition of the oxidation-reduction potential (partial nitrification/total nitrification); and adjusting the reference range of oxygen concentration to a new set of values to correct the oxygen concentration toward a preselected desired level.

2. The process as claimed in claim 1, wherein the reference range of oxygen concentration is reduced when the transition of the oxidation-reduction potential occurs when the oxygen concentration occurs at a value below a current reference range.

3. The process as claimed in claim 1, wherein the reference range of oxygen concentration is increased when the transition of the oxidation-reduction potential fails to be reached when the oxygen concentration is at a value within a current reference range.

4. The process as claimed in claim 1, wherein, when the value of the oxygen concentration or the oxidation-reduction potential is below a preselected acceptable level, an alarm is triggered.

5. The process as claimed in claim 1, wherein, during the combination of a oxygen concentration above an upper threshold and oxidation reduction potential below a lower threshold, an alarm is triggered.

* * * * *